United States Patent [19]
Dixon

[11] Patent Number: 5,108,277
[45] Date of Patent: Apr. 28, 1992

[54] APPARATUS FOR COOLING EXTRUDED MATERIAL

[76] Inventor: John A. Dixon, 2340 Exline Cir., Hudson, Ohio 44236

[21] Appl. No.: 543,672

[22] Filed: Jun. 25, 1990

[51] Int. Cl.⁵ .............................................. B29C 47/88
[52] U.S. Cl. .............................. 425/72.1; 264/211.13; 264/211.18; 425/143; 425/404; 425/445
[58] Field of Search ................... 425/67, 68, 70, 71, 425/72.1, 143, 404, 445, 446; 264/211.13, 211.18, 566, 569

[56] References Cited

U.S. PATENT DOCUMENTS

| | | | |
|---|---|---|---|
| 3,221,084 | 11/1965 | Peticolas | 425/72.1 |
| 3,280,429 | 10/1966 | Haley | 425/72.1 |
| 3,668,288 | 6/1972 | Takahashi | 425/72.1 |
| 3,769,380 | 10/1973 | Wiley | 264/171 |
| 4,543,051 | 9/1985 | Maillefer | 264/566 |
| 4,689,000 | 8/1987 | Kouichi et al. | 425/72.1 |
| 4,808,098 | 2/1989 | Chan et al. | 425/72.1 |

Primary Examiner—James C. Housel
Attorney, Agent, or Firm—Tarolli, Sundheim & Covell

[57] ABSTRACT

An apparatus is located downstream of an extruder for cooling extruded material exiting the extruder. The apparatus includes a housing having a material passage. The material passage is dimensioned so as to have a larger cross section than a cross section of the extruded material. The apparatus further includes a system for controlling the temperature of at least a portion of the housing. The apparatus further includes a plurality of fluid passages in the housing and connectable to a source of pressurized fluid for providing fluid communication between the source of pressurized fluid and the material passage in the housing. The fluid passing through the fluid passages changes to a temperature having a value functionally related to the temperature of the temperature-controlled portion of the housing. The pressurized fluid passing through the fluid passages supports and cools the extruded material as the extruded material passes through the material passage.

5 Claims, 3 Drawing Sheets

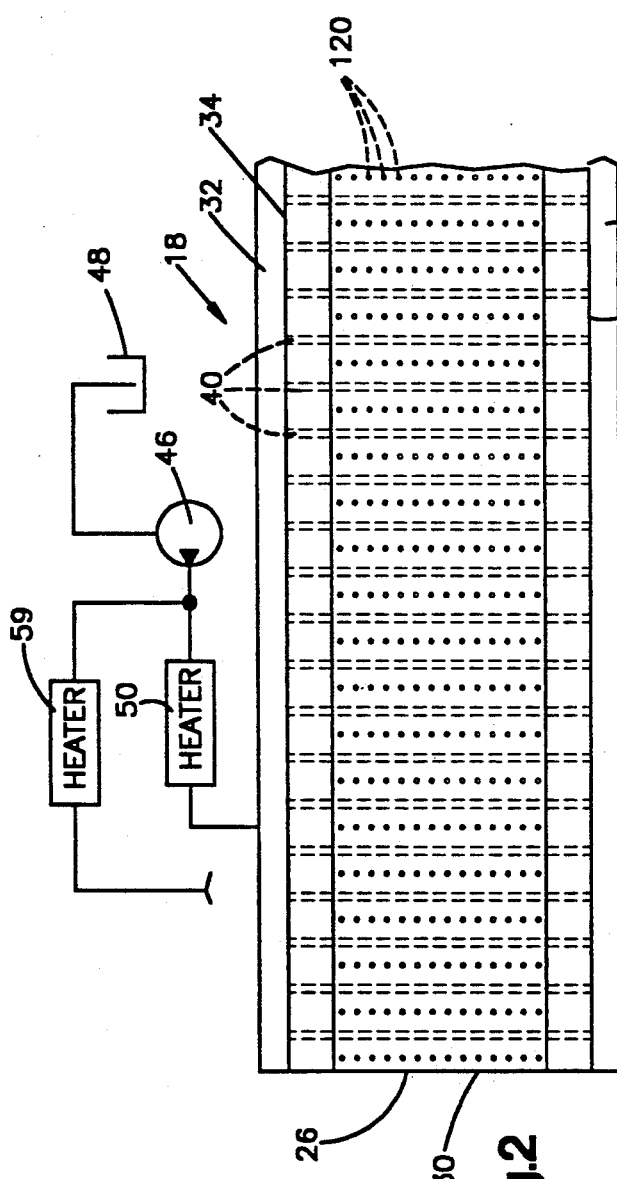
Fig.2
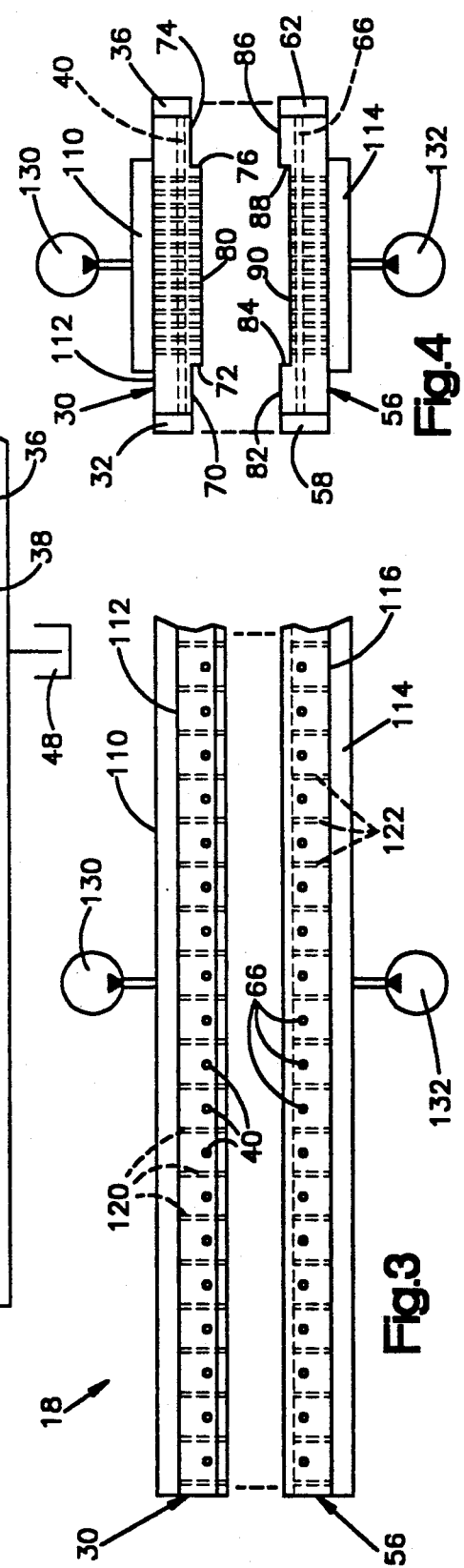
Fig.4
Fig.3

APPARATUS FOR COOLING EXTRUDED MATERIAL

TECHNICAL FIELD

The present invention relates to processing material from an extruder, and is particularly directed to an apparatus for cooling the material from the extruder.

BACKGROUND ART

Methods and apparatus for cooling material delivered from an extruder are known. One known method and apparatus moves the extruded material across a cooling table while directing air from cooling fans towards the extruded material. Another known arrangement provides physical contact between the extruded material and a mass preferably made from metal, with heat exchange occurring between the extruded material and the mass.

A disadvantage in using some known cooling arrangements is that the surfaces of the extruded material can be marred as the extruded material passes through or in contact with an associated cooling device.

SUMMARY OF THE INVENTION

An apparatus is disclosed for cooling material exiting an extruder. The apparatus supports the extruded material on a cushion of air while controlling the temperature of the air. The apparatus provides a gradual cooling of the extruded material without marring the surface of the material.

An apparatus, in accordance with the present invention, is located downstream of an extruder for cooling extruded material exiting the extruder. The apparatus comprises a housing having a material passage. The material passage is dimensioned so as to have a larger cross section than a cross section of the extruded material. The apparatus further includes a plurality of fluid passages in the housing and connectable to a source of pressurized fluid for providing fluid communication between the source of pressurized fluid and the material passage in the housing. The apparatus further includes means for controlling the temperature of the pressurized fluid. The pressurized fluid passing through the fluid passages supports and cools the extruded material as the extruded material passes through the material passage.

In accordance with a preferred embodiment of the present invention, the means for controlling the temperature of the pressurized fluid includes means for controlling the temperature of at least a portion of the housing. The temperature of the pressurized fluid, as it passes through the fluid passages, changes to a temperature having a value functionally related to the temperature of the temperature-controlled portion of the housing which is, preferably, less than the temperature of the extruded material as it passes through the material passage.

BRIEF DESCRIPTION OF THE DRAWINGS

The foregoing and other features and advantages of the present invention will become apparent to one skilled in the art to which the present invention relates from reading the following description of preferred embodiments in conjunction with the accompanying drawings, wherein:

FIG. 2 is a longitudinal top view of a portion of the cooling block of FIG. 1;

FIG. 3 is a longitudinal side view of the cooling block of FIG. 2;

FIG. 4 is an end view of the cooling block of FIG. 2;

DESCRIPTION OF PREFERRED EMBODIMENTS

Figure 1:
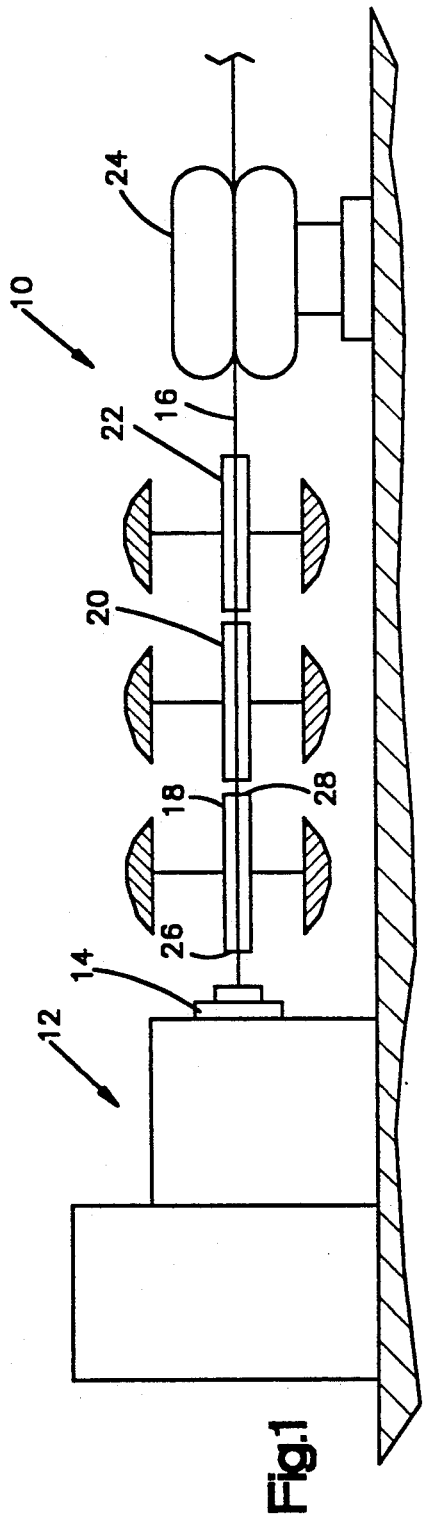
FIG. 1 is a schematic illustration of an extrusion processing line using a cooling block constructed in accordance with the present invention.

Referring to FIG. 1, an extrusion processing line 10 includes an extruder 12 having an outlet die assembly 14 from which extruded material 16 is delivered. Extrusion of material such as plastic is well known in the art and is, therefore, not described in detail. The extrusion processing line 10 further includes a plurality of cooling blocks 18, 20, 22 arranged in tandem and located downstream of the extruder 12. Each of the cooling blocks 18, 20, 22 is rigidly supported so as to remain stationary relative to the extruder 12. Although any number of cooling blocks could be used, for purposes of explanation only, three cooling blocks are illustrated. Since the construction of each of the cooling blocks is identical, only the construction of the cooling block 18 is described in detail.

A puller or haul-off 24 is located downstream of the cooling blocks 18, 20, 22. During operation of the extrusion processing line 10, extruded material 16 leaves the outlet die assembly 14 and consecutively passes through the cooling blocks 18, 20, 22. The cooled, extruded material 16 is then passed from puller 24 and is delivered to a downstream work station (not shown) for subsequent handling as is well known in the art.

Referring to FIGS. 1-5, the cooling block 18 has a first end 26 where extruded material 16 enters the cooling block. The extruded material 16 exits the cooling block at the opposite end 28. The cooling block 18 is a two-piece structure. A first piece 30 of the cooling block 18 (FIGS. 4 and 5) includes a first water manifold 32 located on one side 34 of the cooling block 18 and a second water manifold 36 located on the opposite side 38 of the piece 30 of the cooling block 18. A plurality of water passages 40 extends through the one piece 30 of the cooling block 18 and connects the water manifold 32 to the water manifold 36. The water manifold 32 is connectable to a water pump 46. Pump 46 pumps water from a water reservoir 48 through a first water heater 50 to the water manifold 32. The water heater 50 heats the water flowing from the pump 46 to a first desired temperature before flowing into the water manifold 32. The water manifold 36 is connected to the water reservoir 48.

A second piece 56 of the cooling block 18 includes a water manifold 58 located on one side 60 of the piece 56 of the cooling block 18 and a water manifold 62 located on the opposite side 64 of the piece 56 of the cooling block 18. A plurality of water passages 66 extends through the one piece 56 of the cooling block 18 and connects the water manifold 58 to the water manifold 62. The water manifold 58 is connectable to and receives pressurized water from the pump 46 through a second water heater 59. The water heater 59 heats the water flowing from the pump 46 to a second desired temperature before flowing into the water manifold 58. The water manifold 62 is connected to the water reservoir 48.

The piece 30 of the cooling block 18 includes a mating surface 70 and a mating surface 72 extending perpendicular to the surface 70. Further, the piece 30 of the cooling block 18 includes a mating surface 74 and a mating surface 76 extending perpendicular to the surface 74. A surface 80 extends between and perpendicular to the two surfaces 72, 76.

The piece 56 of the cooling block 18 includes a surface 82 and a surface 84 extending perpendicular to the surface 82. Further, the piece 56 of the cooling block 18 includes a surface 86 and a surface 88 extending perpendicular to the surface 86. A surface 90 extends between and perpendicular to the two surfaces 84, 88.

Figure 5:
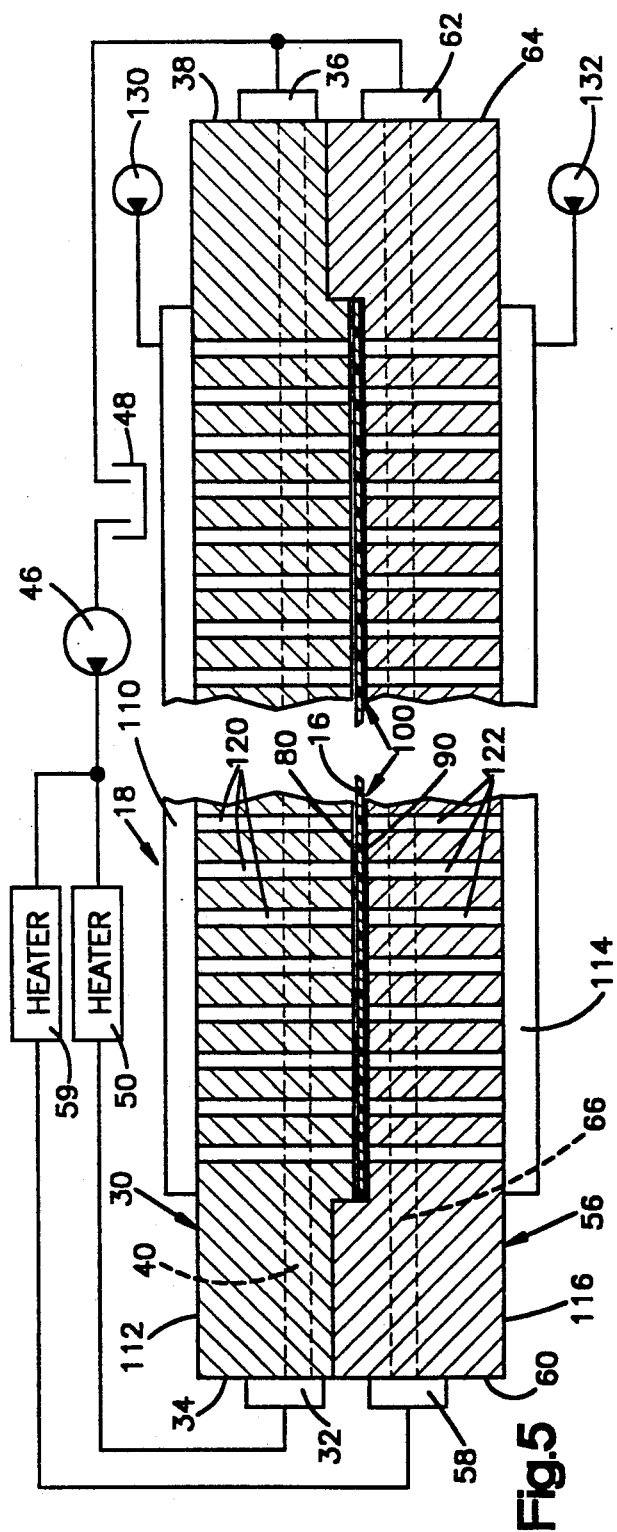
FIG. 5 is a cross-sectional end view of the cooling block shown in FIG. 2.

When the two pieces 30, 56 of the cooling block 18 are put together, the surface 70 abuts against the surface 82 and the surface 74 abuts against the surface 86. The surface 72 is adjacent a portion of the surface 84 and the surface 76 is adjacent a portion of the surface 88. A through-passage 100 is defined between the surface 80 of the piece 30 of the cooling block 18 and the surface 90 of the piece 56 of the cooling block 18. The through-passage 100 is designed to have a cross-sectional dimension greater than the cross-sectional dimension of the extruded material 16 (FIG. 5).

The piece 30 of the cooling block 18 further includes an air manifold 110 located on one side 112 of the piece 30 of the cooling block 18 and a second air manifold 114 located on one side 116 of the piece 56 of the cooling block 18. A plurality of air passages 120 located in the piece 30 of the cooling block 18 connects the air manifold 112 to the through-passage 100 in the cooling block 18. A plurality of air passages 122 located in the piece 56 of the cooling block 18 connects the air manifold 114 to the through-passage 100 in the cooling block 18. The air passages 122 are arranged at substantially right angles to the through passage 100. The air manifold 110 is connectable to a source of pressurized air 130 and the air manifold 114 is connectable to a source of pressurized air 132. The air passages 130 are arranged at substantially right angles to the through passage 100. Air pumped through the passages 120, 122 is directed against the extruded material 16 in the material passage 100 at substantially right angles to the extruded material 16 and exits from the cooling block 18 through the open ends 26, 28. It is contemplated that the air manifolds 110, 114 can be connected to a common source of pressurized air.

During operation of the extrusion processing line 10, extruded material 16 from the extruder 12 enters the cooling block 18 and moves through its associated through-passage 100. Air passes from the source of pressurized air 130 to the air manifold 110 and through the air passages 120 to the through-passage 100 of the cooling block 18. Also, air passes from the source of pressurized air 132 to the air manifold 114 and through the air passages 122 to the through-passage 100 of the cooling block 18.

At the same time, the pump 46 pumps water from the water reservoir 48 through the water heater 50 to the water manifold 32. The water heater 50 acts to heat the water to a first desired temperature. As the water passes from the manifold 32 to the manifold 36 through the passages 40, the piece 30 is heated. As air passes through the air passages 120 into the through-passage 100 of the cooling block 18, it is heated by the heated piece 30.

The water in the water manifold 36 returns to the water reservoir 48.

The pump 46 also pumps water from the water reservoir 48 through the water heater 59 to the water manifold 58. The water heater 59 heats the water to a second desired temperature. As the water from heater 59 passes through the passages 66, the piece 56 is heated. As air passes through the air passages 122 into the through-passage 100 of the cooling block 18, it is heated by the heated piece 56. The water in the water manifold 62 returns to the water reservoir 48.

It will be appreciated that the temperature of the extruded material 16 is greater than the ambient temperature as it first leaves the extruder 12. The extruded material 16 must be cooled gradually to avoid distortion or cracking of the extruded material 16 during the cooling process. The water heaters 50, 59 heat the associated pieces 30, 56 of the cooling block 18 and the air in the associated air passages 120, 122 of the cooling block 18 to a temperature less than the temperature of the extruded material 16 passing through the cooling block 18. The extruded material 16 is gradually cooled by the series of cooling blocks. The temperature of each cooling block is controlled through its associated water heaters to a temperature less than the temperature of the preceding cooling block through which the extruded material 16 passed. Thus, by controlling the temperature of the water pumped through each of the water passages, the temperature of its associated pieces of the cooling block and the temperature of the air flowing through each of the associated air passages are controlled.

The air flowing through the air passages 120 and the air passages 122 also acts to support the extruded material in the through-passage 100 so as to avoid contact between the surfaces of the extruded material 16 and the surfaces 80, 90 of the cooling block 18. By supporting the extruded material 16 in the through-passage 100 of the cooling block 16 with air pressure, marring of the surfaces of the extruded material 16 is avoided as the extruded material 16 passes through the cooling block 18.

Although water is used as the medium by which the temperature of the air in each of the air passages 120, 122 is controlled, it is contemplated that one can control the temperature of the air in each of the air passages 120, 122 without the use of water as the medium. For example, one can directly heat the air flowing from the sources of pressurized air 130, 132.

Further, although the water flowing through the water passages 40, 66 is controlled at preferably one temperature, it is contemplated that the water passages 40 may be controlled at one temperature and the water passages 66 may be controlled at different temperatures. Similarly, some of the water passages 40 of a single piece may be controlled at one temperature and the other of the water passages 40 of the same piece may be controlled at another temperature. It will be appreciated that the number of cooling zones in the cooling block 18 depends upon the number of water manifolds and associated heaters. Such an arrangement provides a temperature gradient within a single block preferably with the warmer end nearer the extruder. Such an embodiment is disclosed in FIG. 6.

Figure 6:
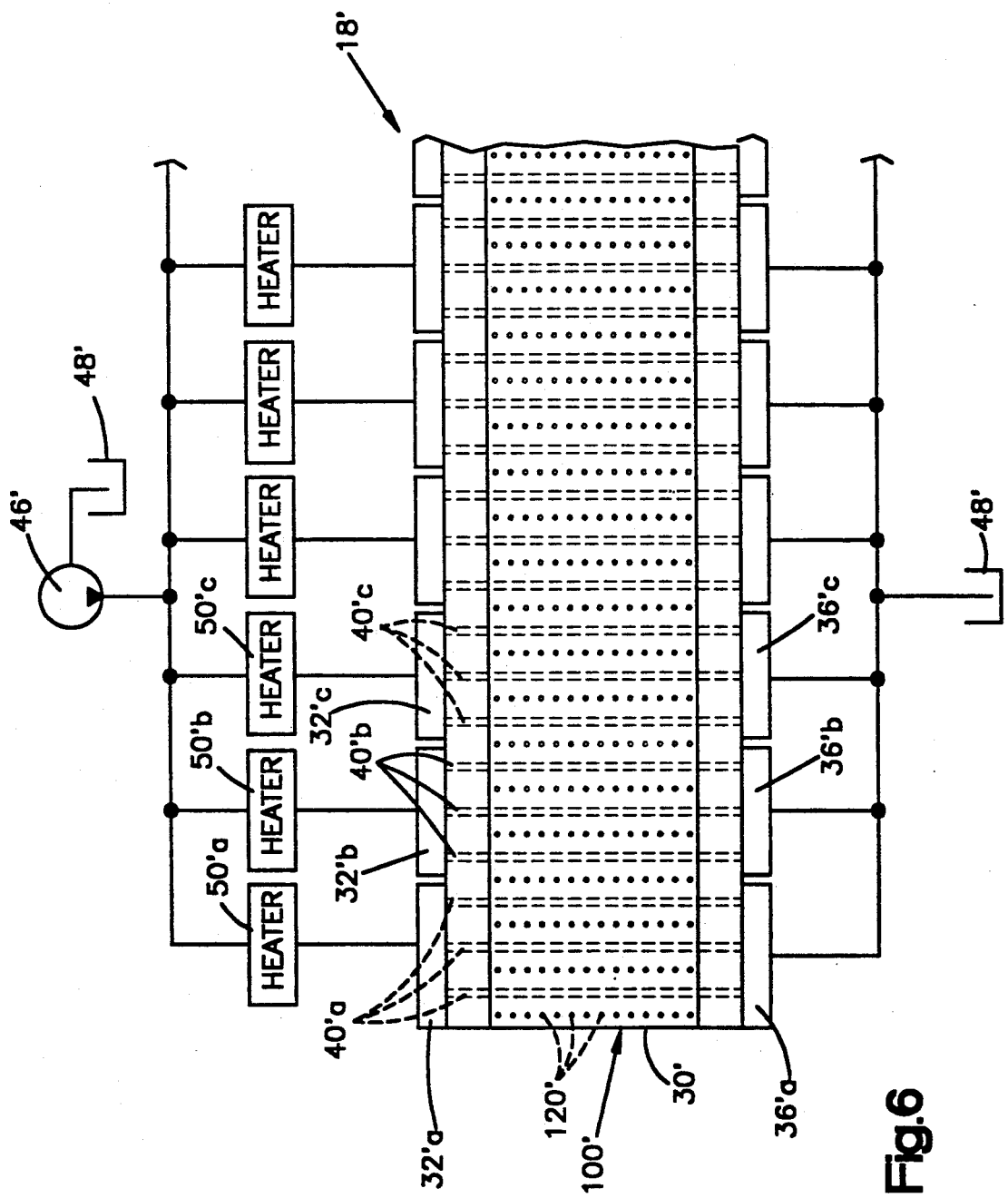
FIG. 6 is a view similar to FIG. 2 illustrating another embodiment of a cooling block.

Since the portion of the embodiment illustrated in FIG. 6 is generally similar to the portion of the embodiment illustrated in FIG. 2, similar numerals are utilized to designate similar components, the suffix letter ""

being added to the numerals associated with the embodiment of FIG. 6.

The cooling block 18, has a plurality of sets of water passages 40'a, 40'b, 40'c, etc. in a top piece with a similar arrangement in the bottom piece. One set of water passages 40'a interconnects between a water manifold 32'a and another water manifold 36'a. The pump 46' pumps water from the reservoir 48' through a plurality of heaters 50'a, 50'b, 50'c, etc. to associated manifolds 32'a, 32'b, 32'c.

Each heater 50'a, 50'b, 50'c heats its portion of the cooling block 18' to an associated temperature. Since the extruded material flows from left to right as shown in FIG. 6, the temperature of the water flowing to the water manifold 32'a is typically higher than the temperature of the water flowing to the water manifold 32'b, etc. Thus, a temperature gradient is established along the longitudinal extent of the through-passage 100'. The air passing through air passages 120' is heated to a temperature of its associated portion of the cooling block 18'. This establishes a cooling gradient within the through-passage 100'. The structure of a bottom piece of cooling block 18' would be constructed similar to the top piece 30'.

By establishing a temperature gradient along the longitudinal extent of the through-passage 100', the cooling of the extruded material moving through the through-passage 100' of the cooling block 18' can be controlled. Such an arrangement permits use of a single cooling block instead of several co-linear cooling blocks.

This invention has been described above with reference to preferred embodiments. Modifications and alterations may become apparent to one skilled in the art upon reading and understanding this specification. It is intended to include all such modifications and alterations within the scope of the appended claims.

Having described the invention, the following is claimed:

1. An apparatus located downstream of an extruder for cooling extruded material exiting the extruder, said apparatus comprising;
    a source of pressurized air;
    a housing having a material passage with spaced apart wall surfaces, said material passage being dimensioned so as to have a larger cross section than a cross section of the extruded material;
    means for controlling the temperature of at least a portion of said housing including a plurality of water passages extending through said at least a portion of said housing, a source of pressurized water in fluid communication with said water passages, and means for controlling the temperature of the water, said means for controlling the temperature of the water including a heater for heating said water; and
    a plurality of air passages in said housing and connectable to said source of pressurized air for providing fluid communication between said source of pressurized air and said material passage in said housing, pressurized air passing through said air passages changing to a temperature having a value functionally related to the temperature of said temperature-controlled portion of said housing, the pressurized air passing through said air passages supporting and cooling the extruded material as the extruded material passes through said material passage, said air passages being arranged so as to direct pressurized air from said air passages against the extruded material in said material passage at substantially right angles to the extruded material, said source of pressurized air supporting said extruded material away from each of said spaced apart wall surfaces of said material passage.

2. An apparatus located downstream of an extruder for cooling extruded material exiting the extruder, said apparatus comprising;
    a source of pressurized fluid;
    a housing having a material passage, said material passage being dimensioned so as to have a larger cross section than a cross section of the extruded material;
    a plurality of fluid passages in said housing and connectable to said source of pressurized fluid for providing fluid communication between said source of pressurized fluid and said material passage in said housing; and,
    means for controlling the temperature of the pressurized fluid, the pressurized fluid passing through said fluid passages supporting and cooling the extruded material as the extruded material passes through said material passage, said means for controlling the temperature of said pressurized fluid including water passages extending through said housing, a source of pressurized water in fluid communication with said water passages, and a heater for heating said pressurized water, said pressurized fluid passing through said fluid passages being heated to a temperature less than the temperature of the extruded material passing through said material passage.

3. An apparatus of claim 2 wherein said material passage has a rectangular shape for receiving the extruded material having a commensurate shape.

4. The apparatus of claim 2 wherein said fluid passages are arranged so as to direct pressurized fluid from said fluid passages against the extruded material in said material passage at substantially right angles to the extruded material.

5. An apparatus located downstream of an extruder for cooling extruded material exiting the extruder, said apparatus comprising;
    a source of pressurized fluid;
    a housing having a material passage with spaced apart wall surfaces, said material passage being dimensioned so as to have a larger cross section than a cross section of the extruded material;
    a plurality of fluid passages in said housing, each of said fluid passage being connected to said source of pressurized fluid for providing fluid communication between said source of pressurized fluid and said material passage in said housing; and,
    means for controlling the temperature of said pressurized fluid, said pressurized fluid passing through said fluid passages for (i) supporting the extruded material away from each of said spaced apart wall surfaces of said material passage of said housing thereby preventing marring of the surfaces of the extruded material and (ii) cooling the extruded material as the extruded material passes through said material passage, said means for controlling the temperature of said pressurized fluid comprising means to control the temperature of at least a portion of said housing including water passages extending through said housing, a source of pressurized water in fluid communication with said water passages, and means for controlling the temperature of the water, said means for controlling the temperature of the water including a heater for heating said water, pressurized fluid passing through said fluid passages being heated to a temperature less than the temperature of the extruded material passing through said material passage.

* * * * *

UNITED STATES PATENT AND TRADEMARK OFFICE
CERTIFICATE OF CORRECTION

PATENT NO. : 5,108,277
DATED : April 28, 1992
INVENTOR(S) : John A. Dixon It is certified that error appears in the above-identified patent and that said Letters Patent is hereby corrected as shown below:

Column 6, Line 51, Claim 5, change "passage" to --passages--.

Signed and Sealed this

Twenty-ninth Day of June, 1993

Attest:

MICHAEL K. KIRK

*Attesting Officer*    Acting Commissioner of Patents and Trademarks